(12) United States Patent
Boulet D'Auria et al.

(10) Patent No.: US 10,125,910 B2
(45) Date of Patent: Nov. 13, 2018

(54) DEVICE FOR PROCESSING AN ELONGATE BODY

(71) Applicants: 3X ENGINEERING, Monaco (MC); TOTAL SA, Courbevoie (FR)

(72) Inventors: Stanislas Boulet D'Auria, Villefranche sur Mer (FR); Hacen Slimani, Nice (FR); Paul Wiet, Le Chesnay (FR)

(73) Assignees: 3X ENGINEERING, Monaco (MC); TOTAL SA, Courbevoie (FR)

( * ) Notice: Subject to any disclaimer, the term of this patent is extended or adjusted under 35 U.S.C. 154(b) by 171 days.

(21) Appl. No.: 15/102,925

(22) PCT Filed: Dec. 10, 2014

(86) PCT No.: PCT/EP2014/077259
§ 371 (c)(1),
(2) Date: Jul. 27, 2016

(87) PCT Pub. No.: WO2015/086695
PCT Pub. Date: Jun. 18, 2015

(65) Prior Publication Data
US 2016/0356412 A1    Dec. 8, 2016

(30) Foreign Application Priority Data

Dec. 10, 2013 (FR) .................................... 13 62380

(51) Int. Cl.
*F16L 55/168* (2006.01)
*B29C 63/10* (2006.01)
*B29L 23/00* (2006.01)

(52) U.S. Cl.
CPC .......... *F16L 55/1686* (2013.01); *B29C 63/10* (2013.01); *B29L 2023/22* (2013.01)

(58) Field of Classification Search
USPC ......................... 156/392, 425, 428, 430, 431
See application file for complete search history.

(56) References Cited

U.S. PATENT DOCUMENTS 1,725,540 A * 8/1929 Robinson ................. D07B 7/14
                                                        242/439.5
1,831,992 A * 11/1931 Boynton ............... H01L 313/26
                                                          29/56.5

(Continued)

FOREIGN PATENT DOCUMENTS

| EP | 1016514 A2 | 7/2000 |
| FR | 2666864 A1 | 3/1992 |
| WO | 2012/010828 A1 | 1/2012 |

OTHER PUBLICATIONS

French Search Report dated Jul. 25, 2014 issued in corresponding French Application No. 1362380.

*Primary Examiner* — Sing P Chan
(74) *Attorney, Agent, or Firm* — Troutman Sanders LLP

(57) ABSTRACT

The device for the local repair or strengthening of an elongate body exhibiting a change in its integrity, by winding one or more layers of tape around the elongate body, comprises two half rings, each having two ends configured to come into contact with one another, means for moving the two half rings relative to one another until they surround the elongate body, without touching, and means for translating the two half rings relative to one another along an axis perpendicular to the axis of the elongate body until the ends of the half rings are in contact to form a ring surrounding the elongate body. In the embodiments, the device includes, on at least one of the half rings, at least one centering pin corresponding, in the other half ring, to an opening with a shape complementary to the shape of the centering pin.

13 Claims, 10 Drawing Sheets

(56) References Cited

U.S. PATENT DOCUMENTS

| | | | | |
|---|---|---|---|---|
| 1,899,850 A * | 2/1933 | Burton | B65H 81/08 | 24/265 R |
| 2,271,528 A * | 2/1942 | Pfohl | B65H 81/08 | 242/441.3 |
| 2,340,326 A * | 2/1944 | Horrigan | B28B 21/94 | 118/108 |
| 2,588,525 A * | 3/1952 | Hertenstein, Jr. | B65H 57/14 | 242/157 R |
| 2,770,284 A * | 11/1956 | Myrick | B28B 21/94 | 118/410 |
| 3,162,992 A * | 12/1964 | Davis | H02G 7/10 | 242/441.3 |
| 3,259,370 A * | 7/1966 | Neale, Sr. | H02G 7/10 | 254/134.3 CL |
| 3,470,057 A * | 9/1969 | Curtis | B29C 63/10 | 156/392 |
| 3,508,998 A * | 4/1970 | Bilbrey | B65H 35/0013 | 156/428 |
| 3,547,731 A * | 12/1970 | Curtis | F16L 58/16 | 156/188 |
| 3,616,072 A * | 10/1971 | Bostrom | B29C 70/16 | 156/244.13 |
| 3,789,594 A * | 2/1974 | Rees | B65H 81/08 | 242/439.5 |
| 4,008,114 A * | 2/1977 | Lindsey | B65H 23/063 | 156/392 |
| 4,012,272 A * | 3/1977 | Tiner | B29C 53/785 | 138/122 |
| 4,058,427 A * | 11/1977 | Wilson | B29C 63/105 | 156/392 |
| 4,061,513 A * | 12/1977 | Danielson | B29C 63/14 | 156/392 |
| 4,069,088 A * | 1/1978 | Cottam | B65H 59/04 | 156/392 |
| 4,113,545 A * | 9/1978 | Stuart, Jr. | B29C 63/14 | 156/392 |
| 4,125,422 A * | 11/1978 | Stuart, Jr. | B65H 81/08 | 156/392 |
| RE30,369 E * | 8/1980 | Wilson | B29C 63/105 | 156/392 |
| 4,264,398 A * | 4/1981 | Pruitt | B65H 81/06 | 156/468 |
| 4,322,262 A * | 3/1982 | Cottam | B65H 81/08 | 156/392 |
| 4,426,834 A * | 1/1984 | Dokmo | B65H 81/08 | 242/441.3 |
| 4,894,981 A * | 1/1990 | Lipp | D07B 7/14 | 57/10 |
| 4,961,798 A * | 10/1990 | Hart | B29C 63/0069 | 156/392 |
| 5,022,595 A * | 6/1991 | Goekler | B65H 81/08 | 242/419.5 |
| 5,046,558 A * | 9/1991 | Koster | E21B 29/10 | 156/392 |
| 5,273,611 A * | 12/1993 | Webb | F16L 59/14 | 156/392 |
| 5,314,565 A * | 5/1994 | Moore | B29C 63/10 | 156/392 |
| 5,346,149 A * | 9/1994 | Cobb | B65H 81/08 | 226/180 |
| 5,491,880 A * | 2/1996 | Labiche | B29C 63/10 | 156/282 |
| 5,588,290 A * | 12/1996 | Cobb | B65H 81/08 | 242/441.2 |
| 5,643,382 A * | 7/1997 | Delimoy | B29C 53/566 | 156/169 |
| 5,735,997 A * | 4/1998 | Reinders | B32B 37/06 | 156/495 |
| 5,954,918 A * | 9/1999 | Belivakici | B65H 35/0013 | 156/468 |
| 6,440,245 B1 * | 8/2002 | Culzoni | B29C 63/06 | 156/187 |
| 7,243,697 B2 * | 7/2007 | Daykin | B29C 63/10 | 156/392 |
| 8,388,785 B2 * | 3/2013 | De Jong | B29C 53/581 | 156/195 |
| 8,480,828 B1 * | 7/2013 | De Jong | B29C 53/581 | 156/184 |
| 9,631,764 B2 * | 4/2017 | Slimani | F16L 55/18 | |
| 2010/0200149 A1 * | 8/2010 | De Jong | B29C 53/581 | 156/98 |
| 2011/0079310 A1 * | 4/2011 | Thompson | B29C 63/105 | 138/99 |
| 2012/0255641 A1 * | 10/2012 | Venero | B29C 63/105 | 138/97 |
| 2015/0127194 A1 * | 5/2015 | Slimani | B29C 63/10 | 701/2 |
| 2016/0356412 A1 * | 12/2016 | Boulet D'Auria | B29C 63/10 | |

* cited by examiner

DEVICE FOR PROCESSING AN ELONGATE BODY

CROSS-REFERENCE TO RELATED APPLICATIONS

This application is the U.S. National Phase of International Patent Application Serial No. PCT/EP2014/077259, filed Dec. 10, 2014, which claims priority to French Patent Application No. 1362380, filed Dec. 10, 2013, both of which are herein incorporated by reference in their entireties.

FIELD OF THE INVENTION

The present invention relates to a device for processing an elongate body. More particularly, the invention relates to the repair or local reinforcement of transport pipes for water, gas, oil or other fluids, in particular underwater.

BACKGROUND OF THE INVENTION

Underwater or land-based pipelines intended to convey fluids (such as aqueducts for water and oil pipelines) or gas undergo thermal, physical or chemical attacks that cause damage. Repairing this damage is costly. These pipelines generally have a substantially circular section.

Repairing such a pipeline may be done via various techniques, such as welding or fastening a sleeve and/or completely replacing a segment. The major drawback of replacing pipeline segments is that they are restrictive to use, since they require stopping the flow of the internal effluent such as liquid, gas or other mixtures, in the portion of the pipeline to be repaired. Rehabilitation techniques from outside the pipelines make it possible to avoid replacing the pipeline segment.

Documents FR 2,666,864 and EP 0,548,231 are known, which describe a system for unwinding, on a pipeline, a tape made up of fibers embedded in thermoplastic material that is melted before placing the tape on the pipeline. Such tape may not ensure good sealing due to the plasticity itself of its material. Furthermore, in underwater environments, heating of the tape is particularly delicate and irregular. The homogeneity flaws of the elasticity thus obtained increase the fragility of the repair. The elasticity of the thermoplastic tape limits the use of this system to repair pressurized pipelines. Lastly, this document describes the assembly of successive contiguous turns, which necessarily have a sealing weakness at their border.

These documents describe, regarding the assembly on the pipeline, a system formed from a first horseshoe-shaped part that is placed on the pipeline and that bears at least three motors to rotate, relative to the axis of the pipeline, inside it, a second circular part until it again touches the first part while having bypassed the pipeline. This complex system has problems with superposition or separation of the tape if it is not perfectly centered. It is furthermore particularly delicate and complex to implement and subject to vibrations due to the weak anchoring of the two parts relative to one another. Lastly, the system is not compatible with the parts of underwater pipelines commonly called risers, bent bars, and splash zone.

BRIEF DESCRIPTION OF THE INVENTION

One aim of the invention is to provide a device for the local repair or strengthening of an elongate body that is reliable, quick, easy to implement and makes it possible to wind a tape, for example preimpregnated and polymerizable, around the zone to be repaired.

Another aim of the invention is to provide a device for the local repair or strengthening of an elongate body capable of adapting to different diameters and different shapes of said elongate body.

To that end, according to a first aspect, the present invention relates to a device for the local repair or strengthening of an elongate body exhibiting a change in its integrity, said device being intended to wind one or more layers of tape around the elongate body, said device including:
- two half rings each having two ends configured to come into contact with one another,
- means for moving the two half rings relative to one another until they surround the elongate body, without touching, and
- means for translating the two half rings relative to one another along an axis perpendicular to the axis of the elongate body until the ends of the half rings are in contact to form a ring surrounding the elongate body.

Because the last movement between the half rings is a translational movement, the respective positioning of the ends of the half rings to form the ring may be more precise. Furthermore, friction is avoided on the elongate body, this friction potentially having a harmful effect on its surface condition, or even applying twisting forces to it between its two half circumferences considered between the half rings if they had to perform a rotational movement relative to one another. These twisting forces could indeed have caused temporary deformations harmful to the repair to be done, or even cause cracks, weak points or tears of the wall of the elongate body or the tape once placed, and optionally, polymerized.

In the embodiments, the device includes, on at least one of the half rings, at least one centering pin corresponding, in the other half ring, to an opening with a shape complementary to the shape of said centering pin.

Owing to these arrangements, the centering of the half rings relative to one another is particularly precise.

In embodiments, the device further includes a preliminary blocking means including:
- a stationary jaw provided with at least two pads forming an obtuse angle relative to one another,
- a removable jaw support including at least one guide for the removable jaw, each said guide guiding a movement of the removable jaw parallel to the stationary jaw,
- the removable jaw, and
- a means for moving the removable jaw supported by a guide of the support toward the stationary jaw.

Owing to these arrangements, the operator may first firmly and quickly secure the device to the elongate body, with the jaws.

In embodiments, the removable jaw support includes a plurality of guides for the removable jaw, said guides being at different distances from the stationary jaw.

Owing to these arrangements, the jaws are compatible with a wide range of elongate body diameters. Furthermore, the positioning of the removable jaw is quick, by simple guiding, this first positioning prohibiting the elongate body from leaving the jaws. Then, the movement of the jaws relative to one another, until the elongate body is pinched between them, prohibits the rotation of the device relative to the elongate body.

In embodiments, the device includes:
- a means for rotating a spool of preimpregnated polymerizable tape around the elongate body, a means for translating the spool parallel to the axis of the elongate body, and a connecting means between the driving means configured to cause the tool to travel in a spiral opposite the outer surface of the elongate body.

Owing to these arrangements, the spool is driven regularly across from the outer surface of the elongate body and travels over the entire surface, over at least one segment of the elongate body. The device for processing the segment of the elongate body may thus be complete.

In embodiments, the connecting means includes:

two toothed half wheels stationary relative to the two half rings on which a moving gear secured to a worm meshes, the axis of the moving gear being rotated around the elongate body by the rotational driving means, and a spool support moved parallel to the axis of the elongate body by the rotation of the worm.

Owing to these arrangements, the implementation of the present invention is particularly simple and precise.

In embodiments, the rotational driving means is manual.

Owing to these arrangements, the operator may choose the movement speed of the tool opposite the outer surface of the elongate body along the helical path, or replace the spool of preimpregnated polymerizable material. Furthermore, one thus avoids providing a motor, which simplifies the device and improves its autonomy and reliability.

In embodiments, the connecting means includes a means for reversing the translation direction actuated when the spool arrives at the end of its longitudinal travel.

Owing to these arrangements, it is possible to perform several successive passages of the spool across from each surface element of the elongate body, by successively following, one or several times, two spirals with opposite pitches.

In embodiments, the reversal means includes a double conical pinion, whereof a gear, called input gear, is freely translating to mesh alternately on one or the other of the other gears, the translation of the input gear being caused by a longitudinal end-of-travel stop.

Owing to these arrangements, the direction reversal is done without human intervention, once the tool reaches the end of its travel.

In embodiments, the spool rotates freely relative to an axis perpendicular to the material tape and the axis of the elongate body.

Owing to these arrangements, the spool is automatically oriented so that its plane includes the tape being placed.

In embodiments, the device includes a means for detecting the end of the tape on the spool.

Owing to these arrangements, even if the spool is not in the operator's field of vision, the latter is notified that the end of the tape has been reached on the spool and may replace it, or connect the tape of another spool to the tape that was being delivered.

In embodiments, the device includes a counterweight configured so that the center of gravity of the device is substantially on the axis of the elongate body.

Owing to these arrangements, the operator is not required to exert force to combat the weight of the moving parts of the device.

In embodiments, the device includes at least one float with a density lower than the density of water.

BRIEF DESCRIPTION OF THE FIGURES

Other advantages, aims and features of the present invention will emerge from the following description, done for explanatory purposes and non-limitingly in light of the appended drawings, in which.

DETAILED DESCRIPTION OF THE INVENTION

Within the meaning of the entire description, an "elongate body" refers to an object that is substantially longer than it is wide, such as pipelines for the passage of a fluid, but also pillars. The elongate body may have a symmetrical or nonsymmetrical section, cylindrical, with a round or square shape, for example. The elongate body is also called pipeline in the rest of the description.

For the rest of the description, a longitudinal axis X is defined parallel to the local main axis of the elongate body to be treated.

"Jaw" refers to a part with a shape suitable for fastening on the elongate body at a second part.

It will hereby be noted that the figures are not to scale.

Figure 1:
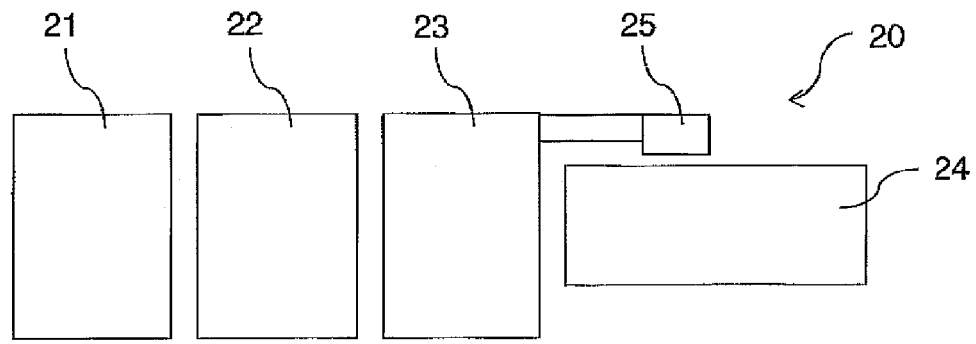
FIG. 1 shows a block diagram of one particular embodiment of the device according to the invention.

FIG. 1 shows a block diagram of one particular embodiment 20 of the device according to the invention:

a means 21 for blocking the device on the pipeline, a positioning means 22, a means 23 for guiding a tool, a tool 25 moved, by the guide means, in rotation around an elongate body 24 and/or in translation along the elongate body 24.

Figure 4:
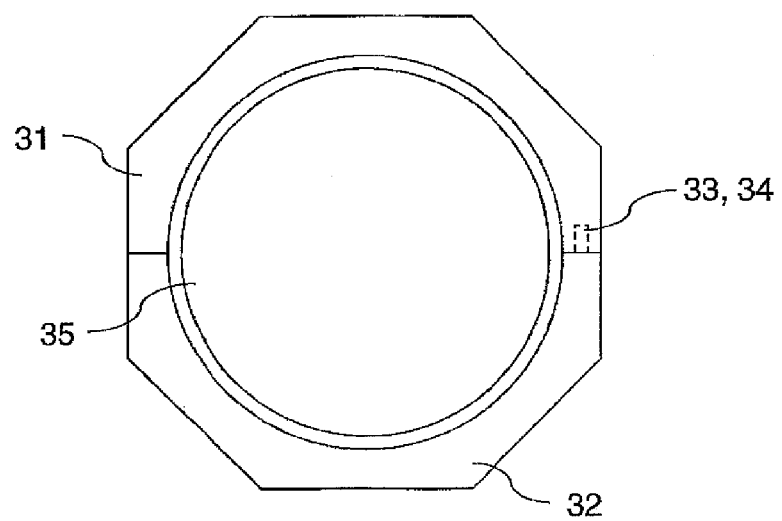
Figure 5:
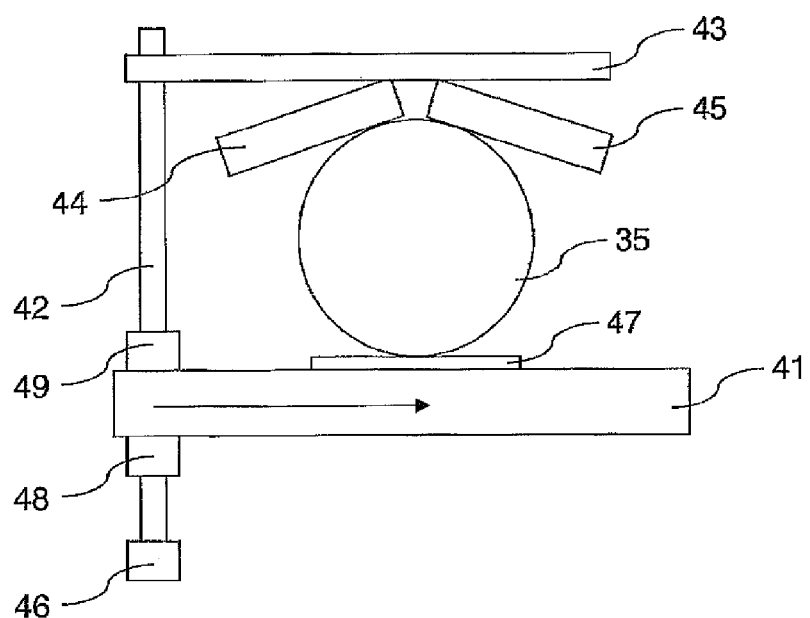
FIG. 5 shows, diagrammatically and in front view, a blocking means of embodiments of the device according to the present invention.

One example of blocking means 21 is illustrated in light of FIG. 5. One example of positioning means 22, preferably on five axes, is briefly described in light of FIGS. 9 and 10. One example of tool guiding means is illustrated in light of FIGS. 2 to 8.

Optionally, a tool holder drum (not shown) is provided between the guide means 23 and the tool 25. The tool 25 is for example made up of a camera or an ultrasound probe, for inspecting the pipeline or guiding another tool, a means for depositing a repair tape (as described in the other figures), a descaling means, a cutting means, for example by laser or saw, a machining, sanding, shot blasting, surface treatment means. The tool may also be a subassembly allowing other operations such as the contribution of sealing material, the surfacing of that material after deposition, the application of the anchoring primer coating, the removal of initial protective or ballast material before the repair, etc.

Optionally, a tool holder or a tool storage box (not shown) is also provided, preferably at the end of the device according to the present invention.

Figure 2:
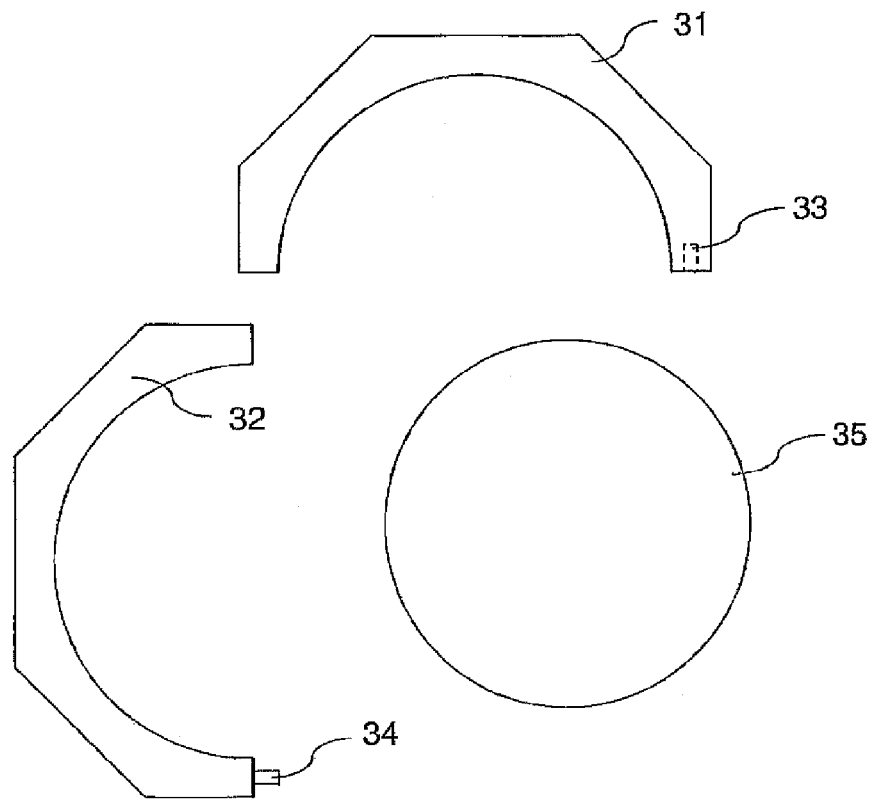
FIGS. 2 to 4 show, diagrammatically and in front view, three steps for positioning the device on an elongate body.

FIG. 2 shows that, before fastening and precise positioning of the device on the elongate body 35, two half rings 31 and 32, the inner surfaces of which are suitable for the section of the elongate body 35, form a substantially right angle between them. The elongate body 35 may therefore be inserted into one of the half rings 31 and 32. Here, it is the half ring 31 that is stationary relative to the blocking means of the device.

Figure 3:
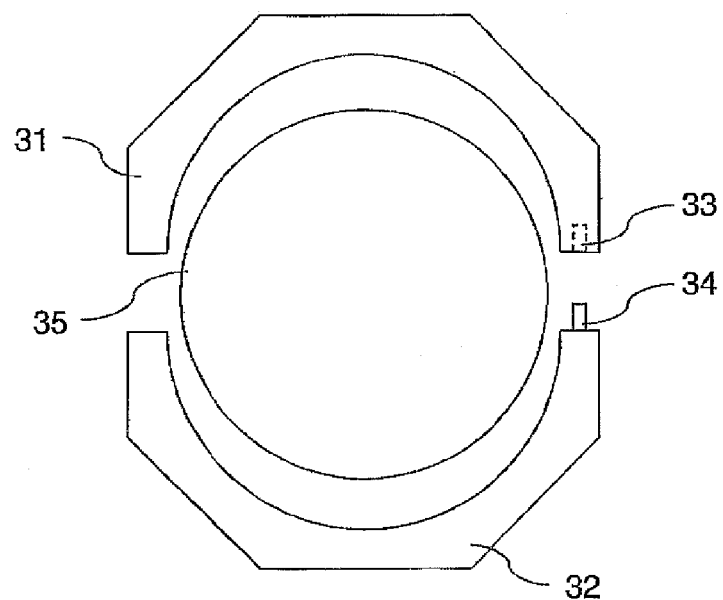

As illustrated in FIG. 3, once the elongate body is partially inserted into the half ring 31, the half ring 32 is folded down across from the half ring 31 to surround the elongate body 35 with two half rings positioned symmetrically, but without touching one another. At least one centering pin 34 of the half ring 32 is then opposite an opening 33 with a complementary shape in the half ring 31.

Lastly, as illustrated in FIG. 4, the two half rings 31 and 32 are closed on the elongate body 35 through a translational movement relative to one another, this movement being perpendicular to the axis of the elongate body 35. During this translational movement, each centering pin becomes positioned in an opening with a complementary shape.

Because the last movement between the two half rings 31 and 32 is a translational movement, the centering pins 34 and their complementary shapes 33 may have very small mechanical allowances, which ensures high positioning precision of the two half rings relative to one another. Furthermore, friction is avoided on the elongate body 35, this friction potentially having a harmful effect on its surface condition, or even applying twisting forces to it between its two half circumferences considered between the half rings 31 and 32 if they had to perform a rotational movement relative to one another. These twisting forces could indeed have caused temporary deformations harmful to the treatment to be done, particularly if that treatment is a repairer, or even cause cracks, weak points or tears of the wall of the elongate body 35.

A ring is thus formed, around the elongate body 35, by the two half crowns 31 and 32.

FIG. 5 shows that the blocking means 21 can assume the form of two jaws 41 and 43. In the present example, the two jaws 41 and 43 are suitable for being fastened on several pipeline diameters. To that end, the jaw 43 is extended by supports 46, 48 and 49. The jaw 41 can thus be moved longitudinally, by inserting it into a support chosen from among the supports 46, 48 and 49, based on the diameter of the pipe line 100, and on the other hand, transversely, as shown in two end positions of this transverse movement, in FIGS. 9 and 10.

The two jaws 41 and 43 are fastened around the pipeline 100 and secured to one another owing to fastening and/or adjustment means. For example, the movement of the jaws 41 and 43 is similar to that of a seal clamp. The jaw 43 is provided with two pads, or bushings 44 and 45, forming an angle relative to one another, to receive different diameters of elongate bodies 35. Optionally, to adapt the device to elongate bodies 35 with small or large diameters, the pads 44 and 45 are changed for more or less thick pads.

The jaw 41 is provided with a pad 47 making it possible to protect the elongate body 35 during gripping.

A worm screw 42 allows this gripping.

Figure 6:
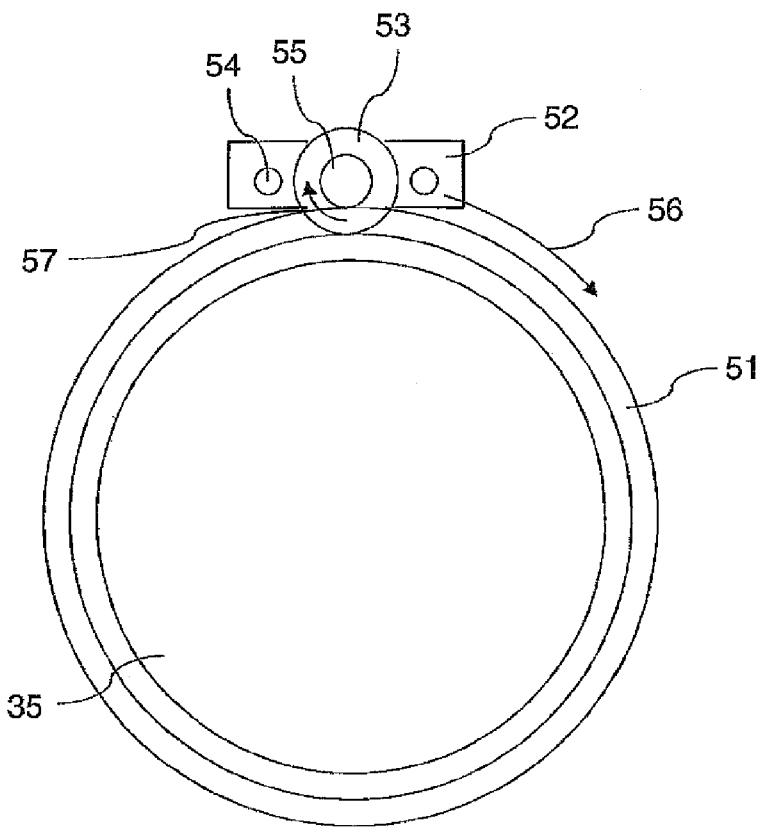
FIG. 6 shows, diagrammatically and in front view, one particular means for translating a tool on a rotating support.

FIG. 6 shows a means 52 for rotating the tool around the elongate body 35, here manual,
    a means 55 for translating the tool parallel to the axis of the elongate body 35, and
    a connecting means between the driving means configured to cause the tool to travel in a spiral opposite the outer surface of the elongate body.

Figure 9:
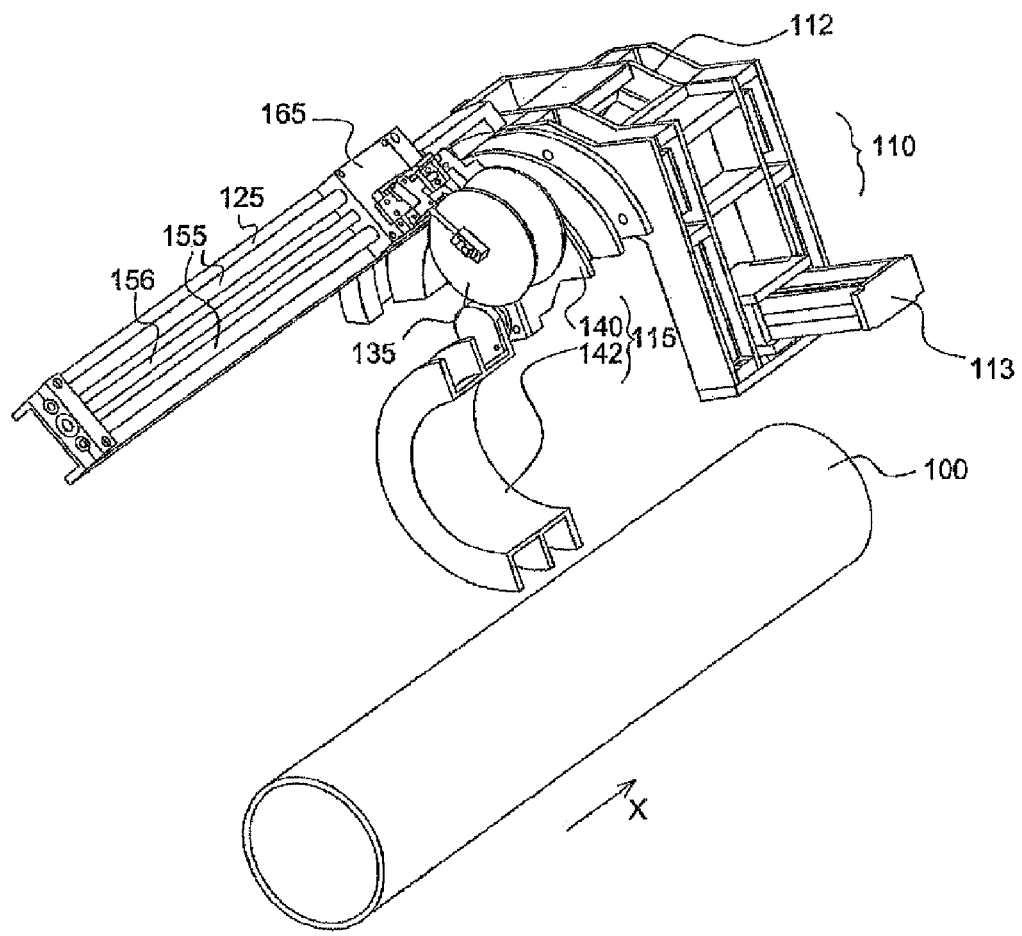
Figure 10:
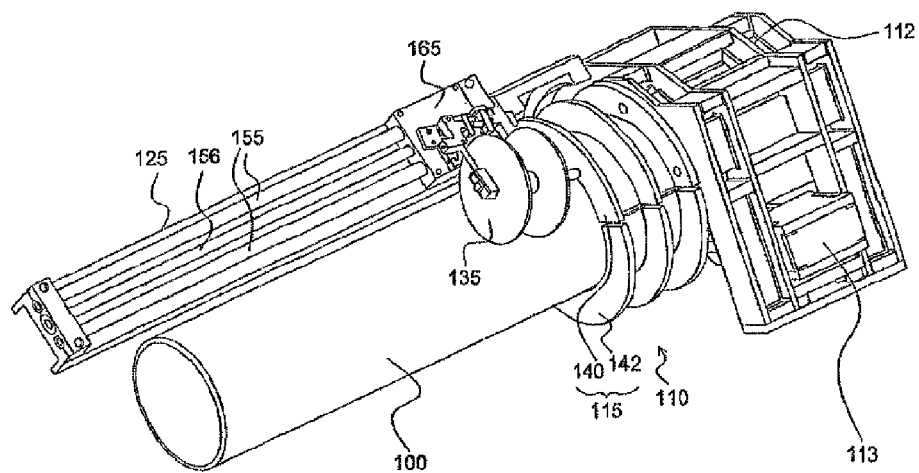

In the embodiment illustrated in FIGS. 6, 9 and 10, the connecting means includes:
    a toothed wheel 51 stationary relative to the elongate body 35 on which a moving gear 53 secured to a worm screw 55 meshes, the axis of the moving gear 53 being rotated around the elongate body by the rotational driving means 55, and
    a tool support 52 or 165 moved parallel to the axis of the elongate body by the rotation of the worm screw 55.

The gear 51 is preferably formed from two half gears secured to the two half rings illustrated in FIGS. 2 to 4. Thus, owing to the centering pins 34, the two half gears are precisely positioned relative to one another, which prevents teeth from being irregular at the connection of the half gears.

A beam 52 bears, in parallel, the worm screw 55, which extends the moving gear 53 and two smooth straight bars 54. A carriage 165 (shown in FIGS. 9 and 10) forming a support for the tool bears on the bars 54 and 155 and has an inner thread in which the worm screw rotates 55.

As will be understood, when the beam 52 is set in rotation around the axis of the elongate body 35, as indicated by the arrow 56, the meshing of the stationary 51 and moving 53 gears causes the moving wheel 53 to rotate, as illustrated by the arrow 57. This rotation drives the worm screw 55, which causes the translation of the carriage and the tool.

The advantages of this embodiment include that the connecting means is configured so that the pitch of the spiral followed by the tool is constant irrespective of the section of the elongate body. Likewise, the connecting means is configured so that the pitch of the spiral followed by the tool is constant irrespective of the centering of the movement device on the elongate body.

Optionally, protection (not shown) for the stationary gear 51 is added.

Figure 7:
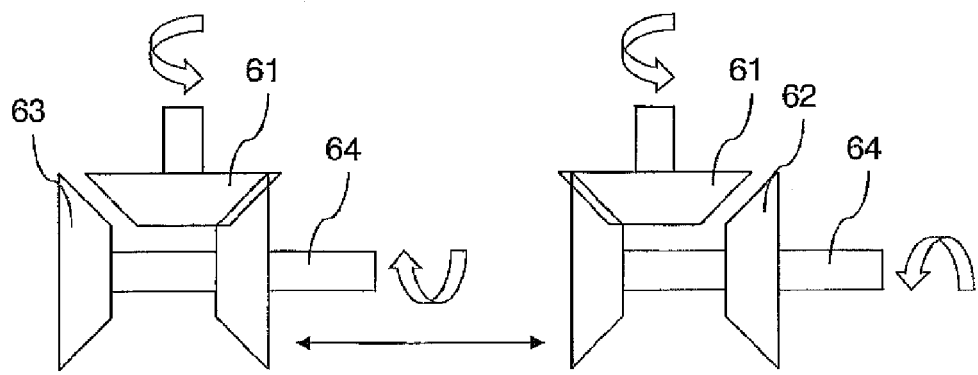
FIG. 7 shows, diagrammatically and in front view, a means for reversing the translation direction of embodiments of the device according to the present invention, FIG. 8 diagrammatically shows a block diagram of one particular embodiment of the device according to the present invention suitable for placing a tape, FIGS. 9 and 10 diagrammatically show a perspective view, before and after fastening on the elongate body, respectively, of one particular embodiment of the device according to the invention, FIG. 11 diagrammatically shows a partial perspective view of one alternative of the first embodiment of the device illustrated in FIGS. 9 and 10, FIG. 12 diagrammatically shows one particular means for detecting the end of a tape on a spool, FIG. 13 diagrammatically shows a perspective view of a second particular embodiment of the device according to the invention, and FIG. 14 diagrammatically shows a perspective view of a third embodiment of the device according to the invention.

FIG. 7 shows a means for reversing the translation direction actuated when the tool arrives at the end of its longitudinal travel. When the tool reaches the end of its travel, at the end of the guide means, a gear reverses the relationship between the rotation and the translation. Thus, by continuing the rotation of the tool in the same direction around the pipeline, it is made to return on the same part of the pipeline, with a pitch identical to that of the first direction.

In FIG. 7, the reversal means includes a double conical pinion, whereof a gear 61, called input gear, is freely translating to mesh alternately on one or the other of the other gears 62 and 63. The means for reversing the rotation direction illustrated in FIG. 7 is positioned between a gear 53 and the worm screw 55. The change in the direction of longitudinal advance of the tool support is thus done owing to this reversal means, situated at the head of the worm screw. The command of the position of the gear 61 has three positions: forward, idle and reverse.

The translation of the input gear 61 between one extreme position, an idle position and the other extreme position is caused either manually by the operator or by a hydraulic, pneumatic or electric motor, under the control of the operator or upon detection of a contact of the tool support with a longitudinal end-of-travel stop. The worm screw 64, which translates a tool support, thus rotates alternately in one direction and the other.

The tool support then always rotates in the same direction around the elongate body, in the driving direction given by the diver or by an underwater hydraulic or electric motor.

The manipulation of the position of the gear 61 can also be done either through a remotely operated handling arm from a submarine or by a stop device when the tool reaches the end of its travel. A push-piece moving the gear 61 can be automated either hydraulically or by electromagnet.

When the position of the tool must change simultaneously with the change in the translation direction, a finger (not shown) rotates this tool. It will be noted that the stops can be moved during the treatment (for example, a tape placement) to change the length of pipeline treated between two successive passages of the tool.

Figure 8:
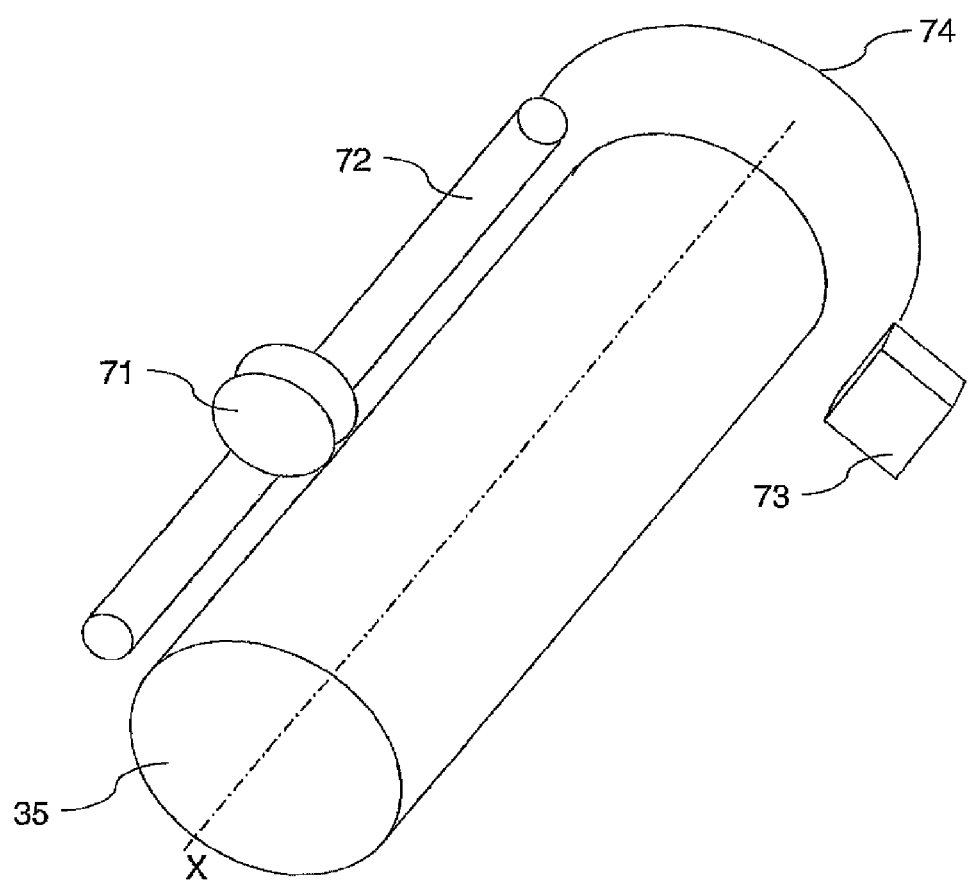

FIG. 8 shows that in order to maintain the center of gravity of the moving parts 71, 72 and 74 of the device, a moving counterweight 73 is preferably provided, the center of gravity of which is symmetrical, relative to the axis of the elongate body 35, with the center of gravity of the other moving parts 71, 72 and 74.

One thus avoids a deformation of the device under the effect of its weight and forces exerted by the operator to combat the weight of the moving parts.

In FIG. 8, the tool is a spool 71 of preimpregnated polymerizable tape connected to a support 72 attached to the device. The support is configured to rotate around the fastening means, and therefore around the elongate body 35. The support 72 also drives the spool in order to wind the preimpregnated polymerizable tape around the zone of the surface to be repaired or strengthened. The spool 71 is connected to the support by a connection that allows it to perform a longitudinal movement both ways in a predetermined direction, preferably along a direction parallel to the axis X. The amplitude of this movement is determined by support means, for example by the length of the support.

In this embodiment, the operation of the device is as follows. Once the device is installed on the elongate body 35 at the zone to be repaired, the spool 71 is actuated to rotate around the surface in order to wind the preimpregnated polymerizable tape around the zone of the surface to be repaired or strengthened. The rotational movement is accompanied by a translational movement parallel to a longitudinal axis of the predetermined elongate body in a first direction. Once the first layer of preimpregnated polymerizable tape is wound, the spool is actuated in rotation and translation in the opposite sense, which makes it possible to wind a second layer on top of the first, homogenously and with a regular winding pitch. Several layers of preimpregnated polymerizable tape are thus wound on the zone to be repaired or strengthened. The device allows homogenous winding of the tape, i.e., with a regular winding tension and pitch, which makes it possible to restore the mechanical integrity of the altered zone.

When a tape or "bandage" is deposited, traveling along the spiral automatically places the axis of the spool bearing the tape to be placed perpendicular to the free tape between the spool and the pipeline.

Preferably, up to 80 passages of the tape are done on the pipeline.

In reference to FIGS. 9 and 10, one particular embodiment of the local repair or strengthening device according to the invention is described.

In this embodiment, the elongate body to be locally repaired or strengthened is an underwater pipeline conveying a fluid. However, the device 110 is adapted to any type of pipeline and other types of tubes, such as boat masts or pillar columns. A portion of a tubular pipeline 100 has a zone with altered integrity, i.e., having a crack, indentation, erosion, or internal or external corrosion, for example.

The device 110 according to the invention allows the local repair or strengthening of a damaged zone of the surface of a pipeline 100 by winding one or more layers of preimpregnated tape around the zone to be repaired.

The device 110 comprises:
removable fastening means on the pipeline 100,
means for rotating a support structure 125 around the fastening means, and thus around the pipeline 100,
means for the longitudinal movement of a spool 135 of preimpregnated polymerizable tape relative to the structure of the support 125, said support including means for limiting the movement of the spool to a predetermined journey, said spool 135 being able to be unwound when it is subject to a given tension.

The device 110 allows the rotational and translational movement of the spool 135, which causes the winding around the pipeline 100 of the preimpregnated polymerizable tape, with a homogenous tension and an adjustable winding pitch. The spool 135 is removable. It may be replaced by another spool on the support.

FIG. 10 illustrates one particular embodiment of the device 110. In this embodiment, the device 110 is fastened removably on the pipeline 100 by a fastening means. In this embodiment, this fastening means comprises at least two jaws 112 and 113. In the present example embodiment, which is non-limiting, the two jaws 112 and 113 are suitable for being fastened on several pipeline diameters, as illustrated in FIG. 5. To that end, as illustrated in FIG. 10, the jaw 112 is extended by a support along which the jaw 113 can be moved longitudinally, based on the diameter of the pipeline 100, and on the other hand, transversely, as shown in two end positions of this transverse movement, in FIGS. 9 and 10.

The two jaws 112 and 113 are fastened around the pipeline 100 and secured to one another owing to fastening and/or adjustment means. For example, the movement of the jaws 112 and 113 is similar to that of a seal clamp. The two jaws 112 and 113 are provided with pads or bushings making it possible to protect the pipeline 100 during gripping.

In this embodiment, the device also includes at least two half gears 140 and 142 with teeth on their circumference, intended to be fastened to one another around the elongate body 100 to drive the worm screw 156. It will be noted that by providing four half gears to form two gears that are identical and parallel, but separate from one another, on the half gears 140 and 142, the holding of the support structure of the spool 135 in position is improved compared to the use of two half gears.

The rotational movement of the support structure 125 around the elongate body 100 and the longitudinal movement of the spool are mechanically dependent, such that the pitch between two successive passages of the preimpregnated polymerizable tape is constant along the elongate body 100.

In the embodiment illustrated in FIG. 10, the connection between the rotational movement of the support structure 125 and the longitudinal movement of the spool 135 includes a gear pair including one gear (shown in FIG. 6 under reference 51) made up of the two half gears 140 and 142, and another gear (shown in FIG. 6 under reference 53) secured to the longitudinal movement means.

The rotation of the support structure 125 sets the gear pair in motion, the gear secured to the longitudinal movement means driving a worm screw 156 moving the spool 135 parallel to the longitudinal axis of the elongate body 100.

Preferably, the mechanical connection between the rotational movement of the support structure 125 and the longitudinal movement of the spool 135 is configured so that the pitch between two successive passages of the preimpregnated polymerizable tape is smaller than the width of the preimpregnated polymerizable tape.

In this embodiment, the device also includes an assembly 115 of at least two circular half guides made up of half gears 140 and 142 provided with flanks protecting the gear pair in which the half gears participate, as stated in light of FIG. 6, to guide the rotation of the support structure around the pipeline 100.

A longitudinal support 125 is connected to the fastening means of the device. In this embodiment, the longitudinal support 125 is a beam with a rigidity above a predetermined value, triangulated by a diagonal bar.

Longitudinal bars 155 configured to support a spool 135 are fastened on the beam 125 of the support. Furthermore, the beam 125 is fastened to the fastening means of the device 110 by one of its ends so as to allow the support 125 to rotate around the fastening means and therefore around the pipeline 100. This fastening is done, in one example embodiment, by a caliper system. Furthermore, a pinion system, cooperating with the notches of the half gears 140 and 142 of the fastening means, allows the rotational movement of the support 125 around the fastening means.

Preferably, the pitch between two successive passages of the preimpregnated polymerizable tape is smaller than the width of the preimpregnated polymerizable tape.

The setting in rotation of the support 125, whether manual or motorized, simultaneously rotates the spool 135 in order to wind the preimpregnated polymerizable tape around the zone of the pipeline 100.

The beam 125 makes it possible to impart high stability to the device, in particular when the spool 135 is in motion. The diagonal bar still further strengthens the rigidity of the device.

The spool 135 is connected to three substantially parallel bars 155 of the support 125 while remaining freely translating relative to these bars 155. These bars 155 make it possible to position the spool 135 stably along an optimal orientation relative to the pipeline 100, in particular according to a predetermined distance and angle relative to the surface of the pipeline 100. Thus, the spool 135 is connected to the support 125 by a connection that allows it to perform a longitudinal movement both ways in a predetermined direction. The amplitude of this movement is determined by support means, for example here by the length of the bars 155 of the support 125.

Furthermore, in an example embodiment given here as an example, the spool 135 is connected to a carriage 165 comprising rollers for stretching the tape and/or applying the tape on the pipeline 100 with a predetermined winding tension range irrespective of the number of winding revolutions needed.

Figure 11:
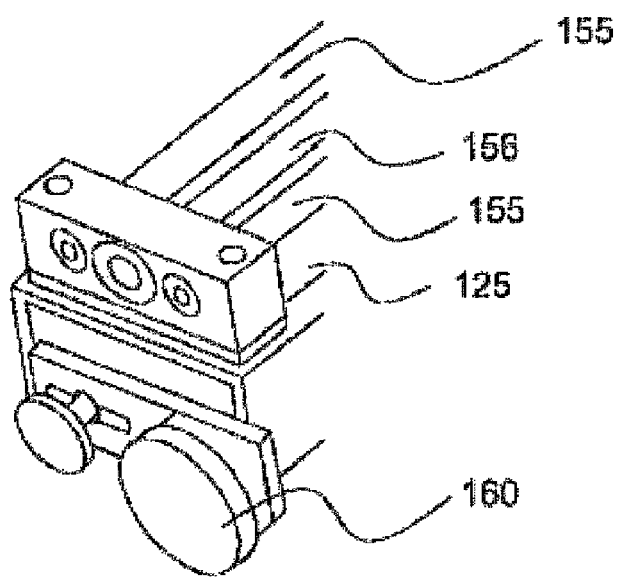

As illustrated in FIG. 11, in embodiments, a roller 160 is added at the end of the beam 125. This roller 160 rests on the pipeline 100 and allows better stability of the support structure of the spool 135 during its rotation around the pipeline 100. In the alternative, a pad (not shown) provided with an antifriction coating, for example Teflon, replaces the roller 160 to perform the same stabilization function and avoids the problems related to potential seizing of the roller 160.

For its operation, the device 110 is first brought even with the zone of the pipeline to be repaired, and fastened on said pipeline 100. Once installed on the pipeline 100 at the zone to be repaired, the spool 135 is actuated to rotate around the pipeline 100 in order to wind the preimpregnated tape around the zone of the surface to be repaired. The rotational movement is accompanied by a translational movement along a longitudinal axis of the predetermined pipeline 100 in a first direction.

Once the first layer of preimpregnated polymerizable tape is wound, the spool 135 is actuated in rotation and translation in the opposite sense. This makes it possible to wind a second layer on top of the first, homogenously and with a regular winding pitch.

Several layers of preimpregnated polymerizable tape are thus wound on the zone to be locally repaired or strengthened. The device 110 performs a homogenous winding of the tape, i.e., with a regular winding tension and/or pressure and pitch, which for example makes it possible to restore the mechanical integrity of the altered zone of the pipeline.

It will be noted that two phenomena are concomitant. On the one hand, there is the initial tension of the tape, which is provided by a device such as an unwinding brake of a tape cartridge. On the other hand, the value of the winding tension, which may vary by a factor of two without affecting the quality of the repair, allows wiping away of the resin and interstitial water, and subsequently a proper application of a tape on the pipeline 100 or on another tape. This winding tension is the result of the initial tension of the tape.

More specifically, the local repair or strengthening method for an elongate body comprises:
a step for fastening a device 110 as described above on the pipeline 100 using the fastening means 112 and 113,
a step for actuating the device 110 by setting the spool 135 in rotation around the pipeline 100 and in translation along a longitudinal direction of the pipeline 100, which allows the winding of successive layers of preimpregnated polymerizable tapes around a predetermined zone of the pipeline 100,
a step for removing the device 110, and
a step for polymerizing the preimpregnated polymerizable tapes.

Thus, in a first step, an operator fastens the device 110 at the zone of the pipeline 100 to be repaired using the fastening means 112 and 113. The device 110 is easily transportable to the repair location, and its weight is suitable for handling by one or more operators or divers in case of an underwater pipeline 100. It is also suitable for handling by a remotely controlled automaton.

Furthermore, the device can be adapted to several pipeline diameters 100 and variable sizes of the zone to be repaired.

Next, in a second step, the two half gears are secured to form a gear, or ring, around the pipeline, as described in light of FIGS. 2 to 4.

Then, the device 110 is actuated manually or automatically by setting the spool 135 (or 320 or 440, in FIGS. 13 and 14) in rotation around the fastening means 112 and 113, and therefore the pipeline 100. At the same time, the spool is translated in a longitudinal direction in a first sense in order to wind a first layer of preimpregnated polymerizable tape around the zone to be repaired. The spool 135, 320, 440 is maintained on the support according to a predetermined distance and angle relative to the pipeline 100, which allows winding with a regular winding tension and pitch. The translational travel of the spool 135, 320, 440 is defined in both directions by support means. Once the first layer is wound, the spool 135, 320, 440 is actuated in translation in the opposite sense, also still in rotation around the pipeline 100, which makes it possible to wind a second layer of preimpregnated polymerizable tape on top of the first. The layers of tape are thus superimposed optimally in terms of winding tension and with a regular pitch. The operations require little effort from operators for a high-quality repair. The actions are repeated to wind as many layers as necessary to allow the repair of the damaged zone or local strengthening of the pipeline.

In specific embodiments, between two journeys of a spool 135, 320, 440 along and around the pipeline, the spool 135, 320, 440 is replaced to change, between two successive layers, the characteristics, in particular chemical or mechanical, of the preimpregnated polymerizable tape to be wound. For example, the successive tapes may have different components (for example, carbon fibers, glass fibers or other component), different resins, different weaves, different fiber or yarn orientations, different widths or different thicknesses. A superposition of layers of tapes is thus done which, once polymerized, combine their respective technical advantages, in particular in terms of stiffness, isotropy, flexibility or sealing.

In a third step, the device 110 is removed from the pipeline 100, and in a final step, the polymerization of the preimpregnated polymerizable tape is initiated by means known by those skilled in the art that in particular depend on the type of preimpregnated polymerizable tape used and the conditions of the repair. For example, this polymerization may be initiated by ultraviolet rays or by a heat contribution.

Figure 12:
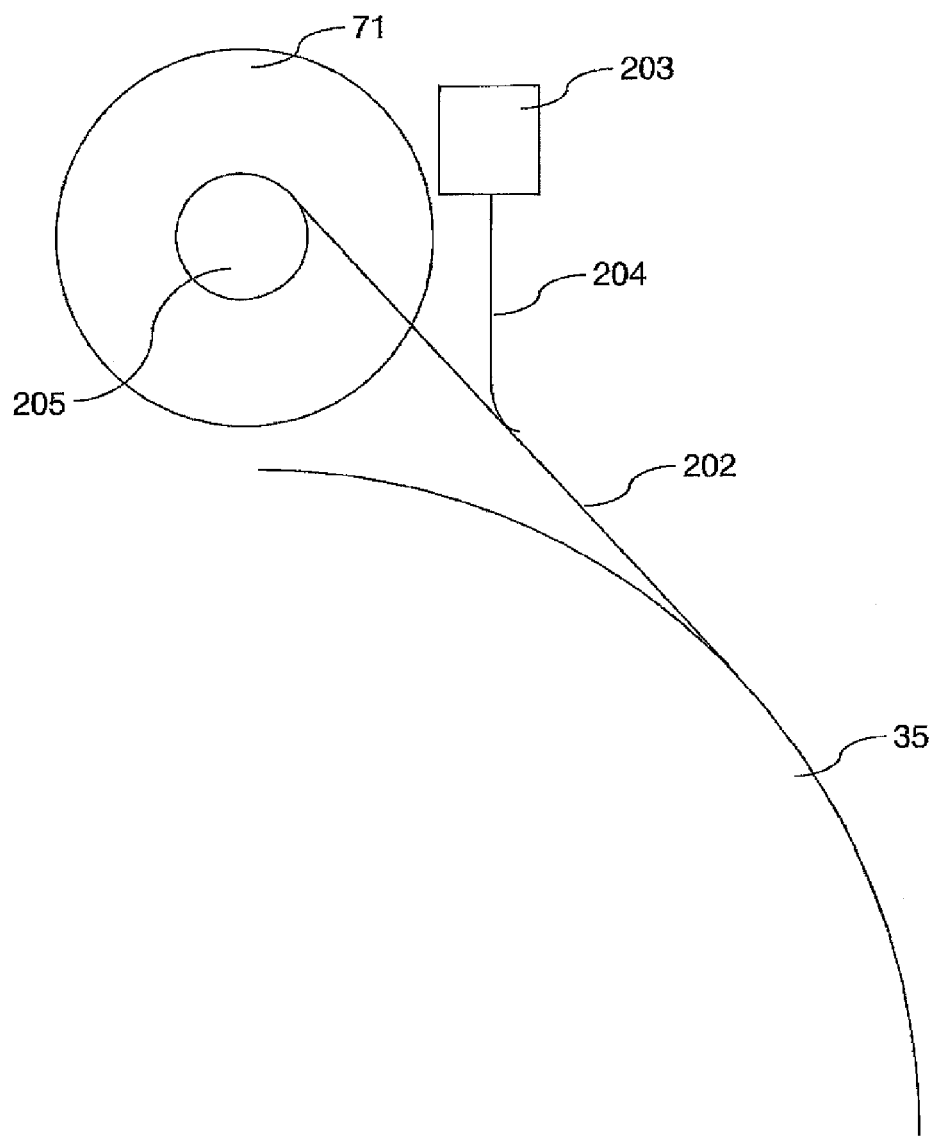

In FIG. 12, means are shown for detecting that a spool 71 is empty. To that end, on the pathway of the tape 202, from the spool 71 to the elongate body 35, following a tangent to the elongate body 35, a blade 204 is positioned that is connected to a movement sensor 203 of the blade 204 or a contactless system (for example, a proximity sensor). For example, this sensor 203 is a switch that is closed when no force is exerted on the blade 204 or an optical sensor.

In preferred embodiments, the detection of a tape end in the spool 71 blocks the rotation of the tool holder.

In other embodiments, the sensor 203 causes a signal to be emitted, for example the lighting of a lighted indicator or a graylight (not shown), or the emission of a haptic signal such as a vibration, so that the operator is immediately informed of the end of the tape.

To ensure a winding tension value comprised in a tension interval extending from a predetermined value to twice that predetermined value, a means 205 for managing the tension of the tape can be incorporated into the hub of the support of the spool 71. For example, this means 205 for managing the tension is a torque limiter. As described elsewhere, the constant tension of the tape favors the quality of the repair.

For the first revolution of the tool around the pipeline, in order to ensure that the tape adheres on the pipeline, at the beginning of the tape, a magnet is added, or a revolution around the pipeline by the tape is done manually and that revolution is held during the beginning of rotation of the tool.

In embodiments, the device according to the present invention is provided with at least one float. For example, each float is made up of a foam base (for example polyurethane, polyethylene or synthetic) cut to the necessary size. Preferably, several floats thus formed are assembled to one another, then secured to the device to improve its buoyancy. Owing to these floats, for example positioned along the beam 52, it is possible to manipulate the machine easily in the water, its apparent weight, adjusted by the floats, becoming null or low. Preferably, these floats are given the most hydrodynamic shape possible, suitable for limiting carrying away by the current. Alternatively, and in particular by shallow depth, it is possible to use parachutes, air bubbles captured in a bag, inflated on request by the diver and attached to the machine to be manipulated.

Figure 13:
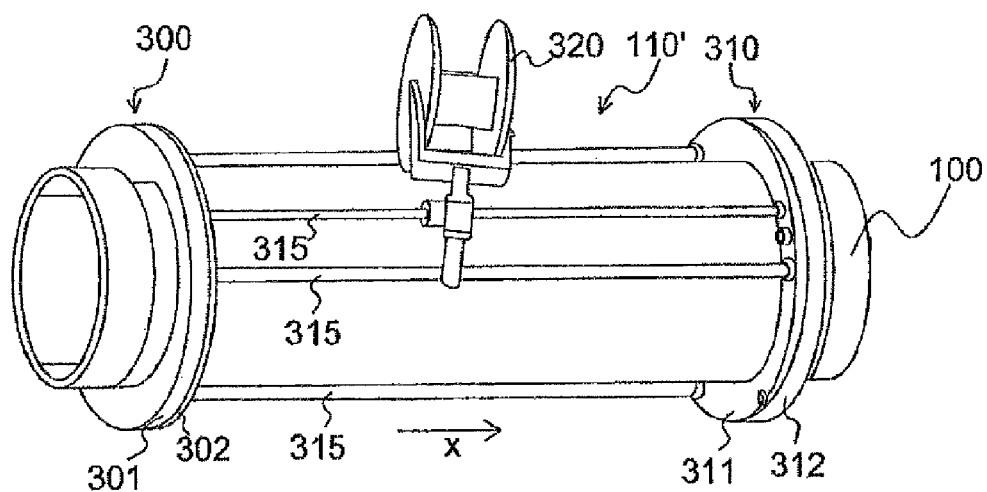
Figure 14:
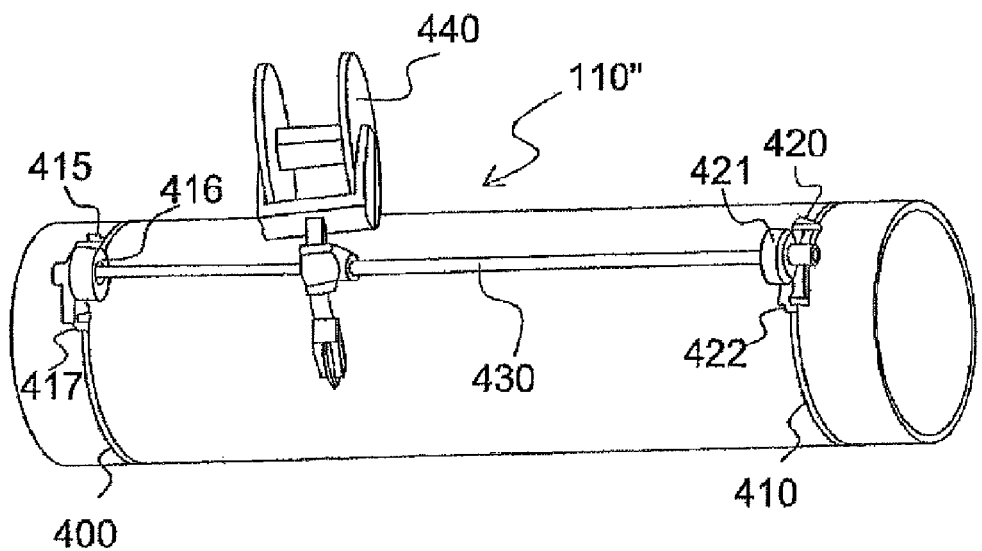

FIGS. 13 and 14 show alternative embodiments.

FIG. 13 diagrammatically illustrates an alternative embodiment of the device 110' according to the invention.

In this embodiment, the fastening means for fastening the device 110' to the pipeline 100 comprises two assemblies 300 and 310 of two half guides formed by a groove 301 and 312, respectively, surrounded by flanks 302 and 311, respectively, bearing guide bars 315 parallel to the pipeline 100. A spool 320 is supported by a support structure mounted on at least one guide bar 315.

FIG. 14 diagrammatically illustrates an alternative embodiment of the device 110" according to the invention.

In this embodiment, the fastening means for fastening the device 110' to the pipeline 100 comprises two chains 400, 410 configured to be fastened on either side of the damaged zone of the pipeline 100. Each of the chains 400, 410 performs a journey between gears 415, 416, 417, 420, 421, 422 rotatable on the chain 400, 410. In this embodiment, each chain 400, 410 performs a journey between three gears 415, 416, 417 and 420, 421, 422, respectively.

The gears 416 and 421 are thus rotated around themselves during the rotation of the bar 430, which forms their shared axis, around the pipeline 100.

The support is made up of a longitudinal bar 430, with a predetermined length, that is connected at each of its ends with the gears 415, 416, 417, 420, 421, 422.

A spool 440 of preimpregnated tape is fastened on the bar of the support 430. This spool 440 is configured to translate on the bar of the support 430 in both directions.

It should be noted that the device according to the present invention is easy to implement, this device being easily transportable to the site and easily actuated by an operator. Alternatively, the device may be implemented by an automaton, in particular of the remotely operated type, that makes it possible to ensure the repeatability of the strengthening or repair process.

The device is suitable for the local repair or strengthening of land or underwater pipelines conveying fluids or gases, for example oil pipelines.

The spool being removable, it may be replaced by another spool as many times as necessary to repair the altered zone.

When successive layers of preimpregnated polymerizable tape are wound, the increase in diameter must be taken into account. The advantage of the device according to the invention is that it allows winding of the tape with a regular tension and pitch. Furthermore, the pitch and tension of the tape are adjusted over the course of the winding, which allows a lasting and sustainable repair. In preferred embodiments, the winding can be interrupted at any time by the operator.

In one application, the device according to the present invention is integrated into or supported by an underwater vehicle (not shown). Preferably, this underwater vehicle and the device according to the present invention are controlled remotely. To that end, the underwater vehicle according to the present invention includes communication means and remote actuating means for the device. Preferably, the underwater vehicle includes at least one camera and a device for remotely transmitting images captured by each camera.

Thus, an operator situated remotely can view and control the placement of the device on the elongate body, then the operation of the device.

The invention claimed is:

1. A device for a local repair or strengthening of an elongate body exhibiting a change in its integrity, the device being intended to wind one or more layers of tape around the elongate body, the device comprising:
   two half rings, each half ring having two ends configured to come into contact with one another;
   the two half rings being configured to move relative to one another until they surround the elongate body, without touching, and able to translate, relative to one another, along an axis perpendicular to the axis of the elongate body until the ends of the half rings are in contact to form a ring surrounding the elongate body; and
   a preliminary blocker comprising:
      a stationary jaw provided with at least two pads forming an obtuse angle relative to one another;
      a removable jaw;
      a removable jaw support including at least one guide for the removable jaw, the at least one guide guiding a movement of the removable jaw parallel to the stationary jaw; and
      a moving apparatus moving the removable jaw supported by a guide of the support toward the stationary jaw.

2. The device according to claim 1, comprising, on at least one of the half rings, at least one centering pin, the other of the half rings defining an opening with a shape complementary to the shape of the centering pin.

3. The device according to claim 1, wherein the removable jaw support comprises a plurality of guides for the removable jaw, the guides for the removable jaw being at different distances from the stationary jaw.

4. The device according to claim 1, comprising:
   a rotation driver for rotating a spool of preimpregnated polymerizable tape around the elongate body;
   a translation driver for translating the spool parallel to the axis of the elongate body; and
   a connector between the rotation driver and the translation driver configured to cause the tool to travel in a spiral opposite the outer surface of the elongate body.

5. The device according to claim 4, wherein the connector comprises:
   two toothed half wheels stationary relative to the two half rings;
   a moving gear secured to a worm screw meshing on the two toothed half wheels, the axis of the moving gear being rotated around the elongate body by the rotation driver; and
   a spool support moved parallel to the axis of the elongate body by the rotation of the worm screw.

6. The device according to claim 4, wherein the rotation driver is manual.

7. The device according to claim 4, wherein the connector comprises a reverser for reversing the translation direction, the reverser being actuated when the tool arrives at the end of its longitudinal travel.

8. The device according to claim 7, wherein the reverser comprises double conical pinion, the double conical pinion comprising a gear, called input gear, being configured to freely translating to mesh alternately on one or the other of the other gears, the translation of the input gear being caused by a longitudinal end-of-travel stop.

9. The device according to claim 4, wherein the spool rotates freely relative to an axis perpendicular to the material tape and the axis of the elongate body.

10. The device according to claim 4, comprising a detector for detecting the end of the tape on the spool.

11. The device according to claim 1, comprising a counterweight configured so that the center of gravity of the device is substantially on the axis of the elongate body.

12. The device according to claim 1, comprising at least one float having a density lower than the density of water.

13. The device according to claim 1, wherein the two half rings comprise:
   a first half ring, the first half ring being stationary with regard to the blocker; and
   a second half ring configured to be folded across from the first half ring.

* * * * *